July 14, 1959 — M. VOOGD — 2,894,363
WRAPPING
Filed April 29, 1957 — 2 Sheets-Sheet 1
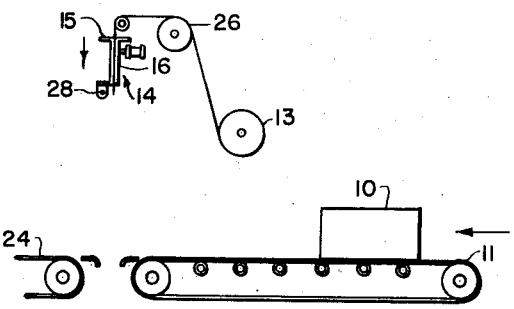
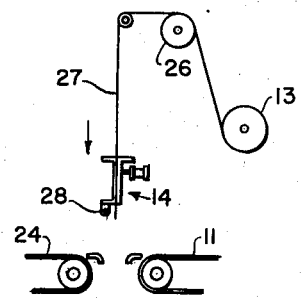
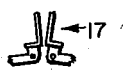
FIG. 2  FIG. 1
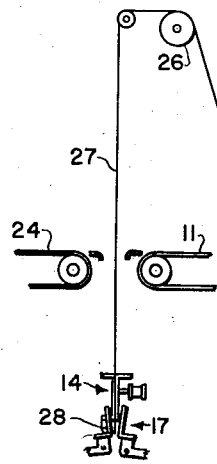
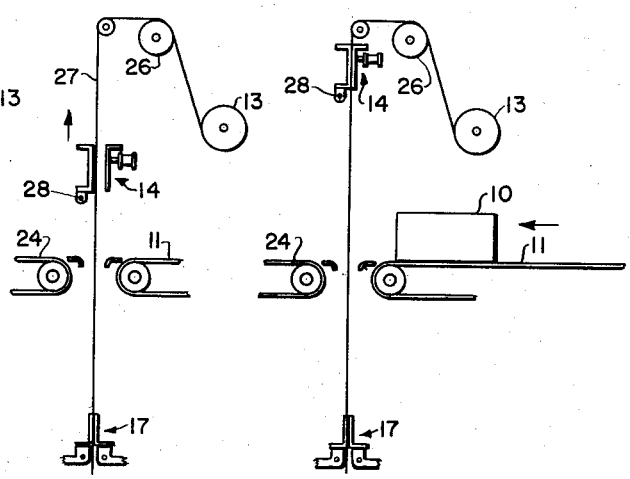
FIG. 3  FIG. 4  FIG. 5
INVENTOR:
MAARTEN VOOGD
BY H. D. Burd
HIS ATTORNEY July 14, 1959

M. VOOGD 2,894,363

WRAPPING

Filed April 29, 1957

INVENTOR:
MAARTEN VOOGD
BY: H. D. Birch
HIS ATTORNEY

United States Patent Office 2,894,363
Patented July 14, 1959

2,894,363

WRAPPING

Maarten Voogd, Long Beach, Calif., assignor to Shell Development Company, New York, N.Y., a corporation of Delaware Application April 29, 1957, Serial No. 655,821

1 Claim. (Cl. 53—228)

This invention relates to improvements in methods and apparatus for wrapping plastic films around an object or a stack of objects and more particularly it relates to novel and improved methods and apparatus for feeding or dispensing plastic film wrap.

The wrapping of objects with a film such as, for example, thermoplastic films such as polyethylene, rubber hydrochloride, styrene, isobutylene copolymers, and the like, is becoming increasingly a common practice. These wrapping materials have certain advantages over wraps made of paper.

These commercially available plastic film wraps consist of relatively more expensive material and consequently as a result, as thin a film as practical is employed.

Although the thin films have great strength and are capable of rough usage they present a problem in the operation of machines wherein a continuous sheet of film is advanced or dispensed for wrapping objects.

In particular, the films are often of such a thickness that the usual methods and apparatus used for feeding the usual wrapping materials into wrapping position are unable to ensure the delivery of the film to its required station.

In the present invention applicant has provided a way of advancing continuous wrapping materials such as thermoplastic and other films which results in continuous operation of the machines with delivery of the film to its required station and ensures an evenly wrapped article.

An object of the present invention is to provide a method and apparatus by which a wrapping film may be placed around an article to be wrapped.

It is another object of the invention to provide a method and apparatus whereby thin wrapping film may be advanced to a wrapping position without damage to the film.

Still another object of the invention is to provide a method and apparatus which is adaptable to use with simple mechanism for wrapping articles.

Other objects and advantages will become apparent in the following specification taken in connection with the accompanying drawings in which:

Fig. 1 is a side elevation shown schematically of an apparatus embodying the principles of the invention for advancing a film wrap around an article.

Fig. 2 is another view of the mechanism of Fig. 1 showing the mechanism advancing the end of a film wrap to a lower position on the machine.

Fig. 3 shows the mechanism of Figs. 1 and 2 with the end of the film wrap in lower position on the machine.

Fig. 4 shows the mechanism of Figs. 1, 2 and 3 with the advancing mechanism part way returned to its uppermost position.

Fig. 5 shows the mechanism of the previous figures with the advancing mechanism returned to its uppermost position.

Figs. 1 through 5 show the apparatus for advancing the film, the figures being arranged in the sequence that the film wrap is advanced.

The mechanism may be used to advance a film for wrapping a stack of objects such as a stack of writing paper sheets or the object may be a single solid object such as a block or bale of natural or synthetic rubber.

Figure 6:
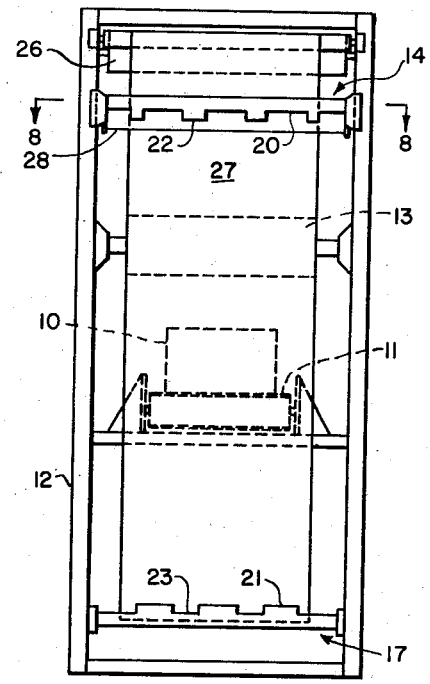
Fig. 6 is a sectional elevation showing the clamps in position with the film sheet advanced.
Figure 8:
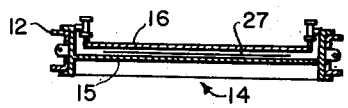
Fig. 8 is a cross-section of Fig. 6 taken on the line 8—8 thereof.

The object to be wrapped indicated as a bale 10 rests on a support 11 and is pushed along by an endless belt, roller mechanism, or other means as is a common practice, towards a vertical frame 12 (shown only in Fig. 6 for sake of clarity). A roll of thin plastic film wrap 13 is held in position on the frame or on another adjacent part of the machine. The roll may be provided with braking or retarding means. The frame 12 is at right angles to the line of movement of the bale, and as will be realized, forms part of the wrapping machine. A separable clamp 14 is free to move vertically downward in vertical grooves or slots in the frame's vertical side members. This clamp 14 is made up of two matching plates 15 and 16 and is so arranged that the plates may be slightly separated and held in separated position by suitable solenoid, pneumatic, hydraulic or mechanical mechanism. The two plates are shown in separated position in Fig. 8. Vertically below the clamp 14 and below the line of travel of the bale 10, a second clamp 17 is provided at the bottom of the frame 12. This clamp is fixed in its position and comprises two matching plates 18 and 19 which may be separated by suitable solenoid or other mechanism.

It is to be noted that both sets of plates forming the clamps 14 and 17 have portions of varying widths thus forming rectangular toothed edges. This feature can be readily seen in Fig. 6 wherein the wider portions of the plates of clamp 14, in a vertical direction, are indicated by number 22 and the wider portions of clamp 17 by number 21.

The narrower portions of the plates of clamp 14 are indicated by numeral 20 and the narrower portions of clamp 17 by numeral 23. A second horizontal support 24 for the bale is provided beyond the vertical frame. This may be the endless belt or roller type as will be understood by those skilled in the art. A freely rotatable roller 26 is supported at the top of frame 12 as guide means for the plastic film. To initiate operation of the machine the free end of the continuous roll of film 13 is led over roller 26 and between the clamp plates 15 and 16 of clamp 14 (the clamp plates being in separated or open position). The film is positioned so that the squared end of the film is either flush with or extends slightly beyond the wider portions 22 of the clamp. The clamp 14 is then closed so that it now holds the film firmly between the two plates, unsupported portions of the film being visible through the narrow portions 20 of the clamp plates.

Fig. 1 shows the film in the above starting position. Upon starting the machine the traveling or upper clamp 14 holding the film end moves downward in the frame.

Fig. 2 shows the clamp 14 moved down to approximately midway between the upper and lower limits of travel of this clamp. Upon reaching the lower limit of travel, as shown in Fig. 3, the traveling clamp intermeshes with the fixed or lower clamp 17 which through suitable control mechanism is at this stage of the cycle of operation in open or separated position.

Figure 7:
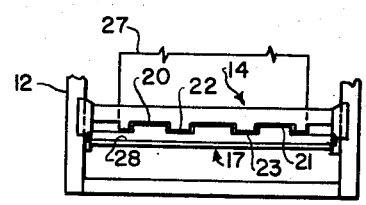
Fig. 7 is a sectional elevation showing the clamps in interlocking lower position.

This Fig. 3 shows schematically the clamps 14 and 17 thus intermeshing. As will be more readily noted from Fig. 7, the teeth or widest portions of the clamp plates of the respective clamps fit into the narrowest portions of the plates respectively.

Upon reaching this lowermost position, trip mechanism actuated by the clamp 14 or otherwise, causes the clamp 14 to open and the lower clamp 17 to close. The clamp 14 in opened or separated position then moves upward, as shown in Fig. 4 to be in position to repeat the cycle. The panel of film 27 just formed, it will be noted, remains in place, its forward edge held firmly by the lower clamp 17.

The bale to be wrapped is next advanced by the conveyor means so as to push against the film curtain. Upon the film curtain being pushed slightly from its vertical position, the curtain is brought into contact with an electrically heated wire 28 which is located close to the top of the frame. By the above contact the film is melted and on the continued horizontal travel of the bale, the clamp 17 is opened and a panel of film is detached and surrounds the bale on at least three faces, namely, the front vertical face, the top horizontal face, and the bottom horizontal face. Providing the film used is of suitable width, the vertical side faces of the bale can be wrapped by positioned guiding vanes and metallic fingers. These elements are well-known in the art and are not part of my invention, and for this reason are not shown in the drawings. The cycle of operation is thereafter repeated. Providing the length of the curtain of film detached is longer than the girth of the bale taken in a direction parallel to the direction of travel of the bale, the film may be lapped at the rear vertical face and the film fused by a heated element, thus sealing the wrap.

The wrapped bale may be advanced into an outer container such as a cardboard carton by means of a pusher bar or ram actuated by air pressure or other means well-known in the art. As will be seen from the above, I have devised a new method and apparatus which enables extremely thin and flexible films to be readily used in wrapping objects. While I have described the invention in relation to polyethylene film and the wrapping of bales of synthetic rubber, it will be appreciated that the invention could possibly be applied to the wrapping of objects with other thin flexible films such as cellophane, and "Saran" wrap.

It will be appreciated that with films which are not thermoplastic some means for separating the panels of film other than an electrically heated wire as described may be required.

The method of film wrapping using the film advancing method here shown is readily adaptable to use in completely automatic machinery or to use in semi-automatic or manually operated mechanisms.

I have in the drawings and specification made a detailed disclosure of a preferred embodiment of my invention in schematic form which will be understood by those skilled in the art. It should be understood that modifications of the arrangement shown falling within the scope of the principles of my invention are intended to be covered by the appended claim.

I claim as my invention:

Apparatus for wrapping cubic shaped objects comprising means for supplying a continuous length of thermoplastic material having a planar section, a pusher means for advancing the objects against said planar section and in a path perpendicular to the plane thereof, an upper movable and separable clamping means for said thermoplastic material movable through a vertical path parallel to and on both sides of said planar section, a lower fixed clamping means for receiving the end of thermoplastic material from the movable clamping means at the lowermost point of its travel path interlocking fingers on the respective clamping means for effecting the transfer of the end of the thermoplastic film from the movable clamping means to the fixed clamping means and a heated wire element mounted parallel to said planar section at the top thereof whereby upon advancement of the objects against the thermoplastic film a panel of film is severed

References Cited in the file of this patent

UNITED STATES PATENTS

| | | |
|---|---|---|
| 1,341,184 | Leumann | May 25, 1920 |
| 1,875,655 | Rawson | Sept. 6, 1932 |
| 1,986,422 | Zwoyer | Jan. 1, 1935 |
| 2,770,933 | Hakomaki et al. | Nov. 20, 1956 |